United States Patent [19]
Allanic et al.

[11] Patent Number: 5,824,259
[45] Date of Patent: Oct. 20, 1998

[54] PROCESS AND INSTALLATION FOR THE MANUFACTURE OF PARTS BY PHOTOTRANSFORMATION OF MATERIAL

[75] Inventors: Al Allanic, Nancy; Claude Medard, Villers-les-Nancy; P. Schaeffer, Atton, all of France

[73] Assignee: Laser International S.A., Villers-les-Nancy, France

[21] Appl. No.: 656,234

[22] PCT Filed: Dec. 5, 1994

[86] PCT No.: PCT/FR94/01414

§ 371 Date: Oct. 8, 1996

§ 102(e) Date: Oct. 8, 1996

[87] PCT Pub. No.: WO95/15842

PCT Pub. Date: Jun. 15, 1995

[30] Foreign Application Priority Data

Dec. 9, 1993 [FR] France .................................. 93 14818

[51] Int. Cl.⁶ ............................ B29C 35/08; B29C 41/02
[52] U.S. Cl. ......................... 264/401; 264/308; 264/497; 425/174.4; 425/404; 425/445
[58] Field of Search ..................................... 264/308, 401, 264/497; 425/174.4, 404, 445

[56] References Cited

U.S. PATENT DOCUMENTS

| 5,238,614 | 8/1993 | Uchinono et al. | 264/401 |
| 5,252,264 | 10/1993 | Forderhase et al. | 264/497 |

FOREIGN PATENT DOCUMENTS

| 0 361 847 | 4/1990 | European Pat. Off. . |
| 416124 | 3/1991 | European Pat. Off. . |
| 0 484 183 | 5/1992 | European Pat. Off. . |

Primary Examiner—Leo B. Tentoni
Attorney, Agent, or Firm—Young & Thompson

[57] ABSTRACT

A method and device for shortening the production run in a stereolithographic process in which a series of layers of liquid or virtually liquid material are cured by exposure to light to form an article. According to the method, at least one covering structure that closely fits the shape of the article is provided on at least one side of the article, whereby a region of reduced disturbance is created between the article and the covering structure during positioning of the layers of liquid or virtually liquid material. The length of time needed for the material to settle is thus substantially reduced.

33 Claims, 7 Drawing Sheets

PROCESS AND INSTALLATION FOR THE MANUFACTURE OF PARTS BY PHOTOTRANSFORMATION OF MATERIAL

BACKGROUND OF THE INVENTION

The present invention relates to a process and an installation for the manufacture of three-dimensional objects by phototransformation of a material which is initially in the liquid or quasi-liquid state or in the state of a powder which can be considered as having some properties of a liquid. In this case the material is assumed to be in the quasi-liquid state.

These processes are increasingly used for manufacturing models of industrial parts and are particularly well-suited to the use of information which is already available in computer-aided design (C.A.D.) computer systems.

More precisely, the process which the invention concerns can be defined as follows:

the starting material is a material in the liquid or quasi-liquid state capable of solidifying under the effect of light, for example by polymerization and/or cross-linking (in the case of a monomer or an oligomer) or else by sintering (for example in the case of ceramics);

a quantity of this material is arranged in a tank and a support, consisting of a plate or a platform, intended to support the object to be manufactured is provided in this tank, means being provided for altering and adjusting the level of the material relative to the support, for example by altering the relative position in terms of height of the tank and the support or by feeding material to be solidified to the tank;

means designed for selectively illumminating predetermined regions of the surface of the material contained in the tank are provided;

means designed for successively depositing a layer of liquid or quasi-liquid material on the surface of each previously solidified layer are also provided;

and at least one object or part is thus produced in successive layers.

As regards both processes and installations, many variants have been conceived and used. However, regardless of the means used and the processes employed, one difficulty has been encountered, which relates to the placement of the layer of liquid or quasi-liquid material on the previously solidified layer, and this has the overall effect of lengthening the elementary manufacturing cycle, and therefore lengthening the time required for producing each object.

This difficulty is due to the fact that, regardless of the means used for positioning a new layer of liquid (scraper, pouring device, etc.), a high quality of planarity of the layer put in place cannot be obtained in a very short time. This results from problems of wetting the solid portions, edge effects which occur at the discontinuities between the liquid and solid material, the formation of menisci, phenomena associated with the relaxation of viscous liquids, etc.

These problems are illustrated in FIGS. 1 to 5, appended to the present description, FIG. 1 of which schematically represents a plan view of a tank C combined with a scraper R to which a translational movement along the arrows F1 and F2 can be imparted, and in which a part P1 is arranged during manufacture, this part having a simple parallelepipedal shape in the example chosen.

FIGS. 2 and 3 respectively represent a sectional view along lines 2—2 and 3—3 in FIG. 1 of the residual defects which may be encountered, and FIGS. 4 and 5 represent similar views to FIG. 2, in the case of a part which has a recessed central portion.

According to one known process, when a layer of material has been solidified by illuminating a predetermined region, the support plate is moved relative to the tank, so as to bring this plate closer to the bottom of the tank, by a height corresponding substantially to the thickness of the new layer which it is desired to solidify on the part being manufactured.

Once this movement has been carried out, a scraper such as R, the lower edge of which is in contact with the liquid material, is moved in such a way as to form a wave of material and to spread a layer of this material over the layer already solidified.

FIGS. 2 and 3 show the type of residual defect which is encountered after passage of the scraper, these defects D1 being particularly sensitive in the first liquid/solid transition region Z1 encountered by the scraper during its translational motion. This transition region Z1 somewhat constitutes a "leading edge", whereas the solid/liquid transition region Z2 constitutes a "trailing edge".

The defects D2 at the trailing edge, or D3 along the lateral transition regions Z3 (FIG. 3), are substantially less pronounced but nevertheless exist. Furthermore, each time the direction of movement of the scraper is reversed, the leading and trailing edges are interchanged and defects of type D1 will finally appear on both sides of the part.

In the case of a part P2 which has a recessed central portion (FIG. 4 and 5), the same types of defect are encountered, with the additional formation of concave menisci D4 (FIG. 4) or convex menisci D5 (FIG. 5) in the recessed central region, if the latter has relatively small dimensions. If, in contrast, its dimensions are relatively large, the same type of defect as in the case of a solid part will be encountered at the inner leading and trailing edges.

It can be seen that, if the phase of illuminating and solidifying a layer takes place while the layer of liquid material has defects such as those represented in FIGS. 2 to 5, the part obtained will be of poor quality since the layer of material solidified will not be planar and a defect amplification phenomenon will occur as the successive layers are fabricated.

This has led to the provision, further to the mechanical operation of spreading the layer of liquid material, using a scraper, a pouring device or any other device, of an additional relaxation phase during which the defects mentioned above will progressively be remedied. However, this relaxation phase takes a relatively long time, the length of which increases as the viscosity of the material used increases, and may represent approximately one third of the duration of a complete layer fabrication cycle. By way of example, in the case of a complete cycle lasting one minute, the solidification time may be of the order of 15 seconds and the preparation phase may represent 45 seconds, approximately half of which corresponding to the material relaxation phase.

Some attempts have been made to shorten the duration of this preparation phase, but they are in general accompanied by increasing complexity of devices employed or by implementation difficulties, such that they actually limit the use of these processes.

Such solutions are, in particular, described in the document U.S. Pat. No. 5,238,614. According to the teachings of this document, walls partially or completely surrounding a part are produced around it during its manufacture. These walls are used in cooperation with a scraper in order to facilitate the smoothing of the surface of a liquid layer previously deposited on the part being fabricated.

This solution only partially solves the problem of positioning the layer of liquid material.

It is furthermore possible to shorten the duration of the solidification phase, for example by increasing the power of the light sources, but apart from the fact that this solution is expensive, it does not affect the preparation time and actually provides only relatively minimal time savings.

SUMMARY OF THE INVENTION

The object of this invention is therefore to improve the efficiency of processes and installations for manufacturing objects by phototransformation, by substantially reducing the time required for positioning a layer of liquid or quasi-liquid material, it being furthermore necessary for this result to be obtained by simple and relatively inexpensive means.

To this end, the subject of the invention is a process of the type defined above, characterized in that, as the or each part is fabricated, at least one casing structure is constructed in at least one region which surrounds the or each part, and optionally in at least one region inside the part, this casing structure, the portion of which closest to the or each part substantially follows the contour of the latter while being separated therefrom by a distance which is sufficiently small for a reduced-perturbation region to be created in the vicinity of the or each part as each successive layer of material to be solidified is put in place.

A further subject of the invention is an installation for implementing the process as defined above.

BRIEF DESCRIPTION OF THE DRAWINGS

The invention will be described in more detail below with reference to the appended drawings, given solely by way of examples, in which.

DESCRIPTION OF THE PREFERRED EMBODIMENTS

No further reference will be made to FIGS. 1 to 5, which have been used for explaining the drawbacks of the processes constituting the prior art in the field.

A complete installation for implementing the process will not be described further here, since such an installation is well-known in the art and is described, for example, in patent application EP-0,416,124 published on Mar. 13, 1991. The content of that application may be considered as being incorporated into the present description by way of reference. Furthermore, machines marketed by the company 3D SYSTEMES under the references SLA250 and SLA500 or by the company EOS GmbH under the references STEREOS 400 and STEREOS 600 are also known.

Such an installation principally comprises a tank containing the material to be solidified, a plate arranged in this tank, for supporting the part which is produced, means for altering and adjusting the relative position in terms of height between this plate and the level of the material to be solidified, means for making it possible selectively to illuminate predetermined regions of the surface of the material contained in the tank, in order to solidify successive layers of material, and means for successively placing a layer of unsolidified material on each solidified layer.

It will be assumed here that the means for positioning successive layers of unsolidified material comprise a scraper to which a reciprocating translational movement along a horizontal direction can be imparted, this scraper having its lower edge in contact with the material contained in the tank. This scraper is preferably flexible or semi-rigid, its characteristics being chosen, in particular, in accordance with the nature and viscosity of the material used.

Thus, for a LOCTITE resin having a viscosity of approximately 1000 centipoise at 30° C., it is possible to use a scraper consisting of a polyethylene sheet with a thickness of 0.2 mm and a free height of 3 cm, fitted into a rigid arm, the lower edge of which is in contact with the liquid.

For a more viscous Du Pont de Nemours resin (SOMOS-5100) (approximately 5000 centipoise at 30° C.) the scraper will have a greater height (for example 5 mm) and will therefore be more rigid.

The materials used are also known in the art and relate to all organic materials which can be cured, by polymerization and/or cross-linking, under the action of light. Mention will be made, purely by way of example, of the resins for stereolithography marketed under the brand names LOC-TITE 8101 and Du Pont de Nemours SOMOS 5100.

The materials used may also be in the form of pastes or very fine powders, solidifiable, for example, by selective sintering under the action of an infrared light source.

Figure 6:
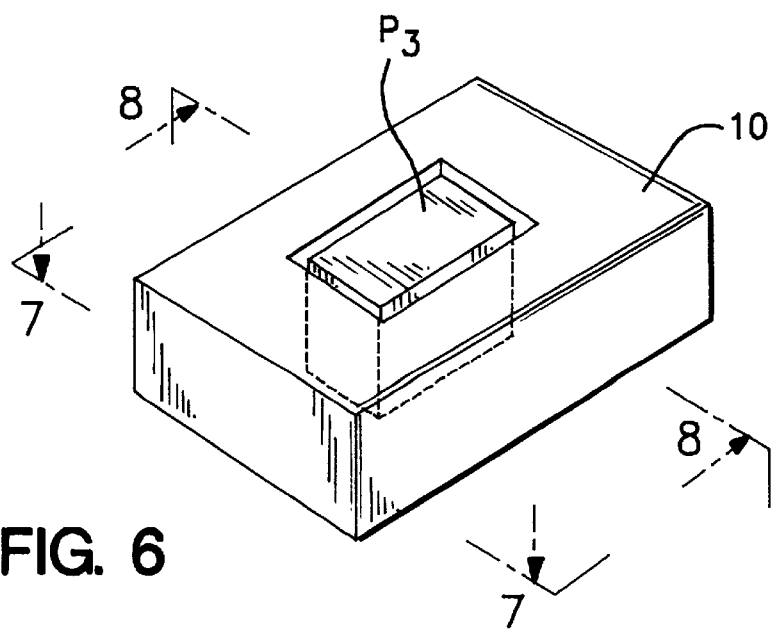
FIG. 6 is a schematic perspective view illustrating the process according to the invention.

In order to illustrate the process according to the invention, FIG. 6 represents a simple part P3 of parallelepipedal shape, surrounded by a casing structure 10 which covers the part on its four side faces.

Figure 7:
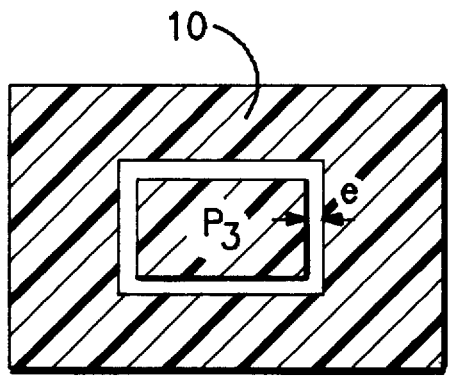
FIGS. 7 and 8 are sectional views, respectively along the lines 7—7 and 8—8 in FIG. 6.
Figure 8:
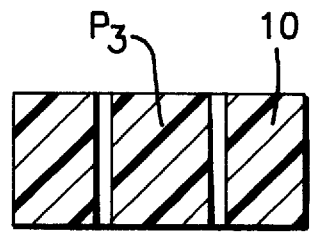

As represented in FIG. 6 and in the sectional views in FIGS. 7 and 8, the casing structure consists of a solid mass of solidified material, fabricated as the part itself is fabricated.

The portion of this mass which is closest to the part somewhat constitutes a covering of the latter and is separated therefrom by a relatively small distance e which depends on the viscosity of the material used.

It is important for the distance e separating the covering from the part to be sufficiently small to prevent the possibility of perturbations such as those represented in FIGS. 2 to 5 being formed.

It is equally well important for the distance over which the coating structure extends, around the part, to be sufficiently large for these same perturbations, represented in FIGS. 2 to 5, to be offset out of the region in which the part proper is located.

Figure 1:
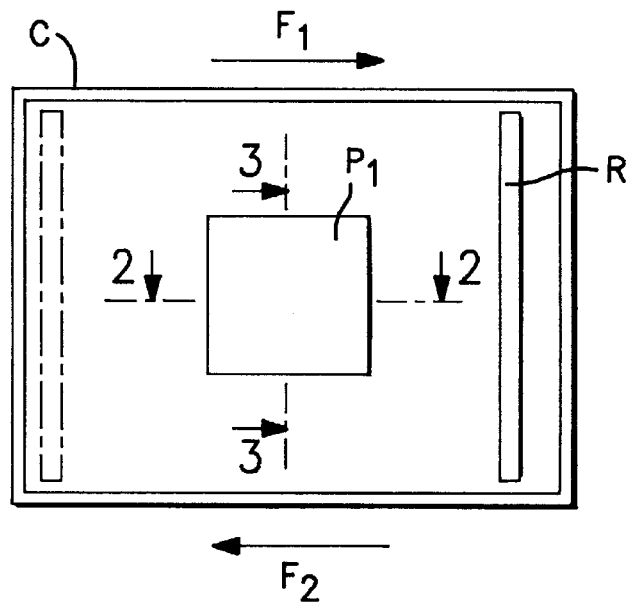
FIGS. 1 to 5 illustrate the drawbacks of some known processes.
Figure 2:
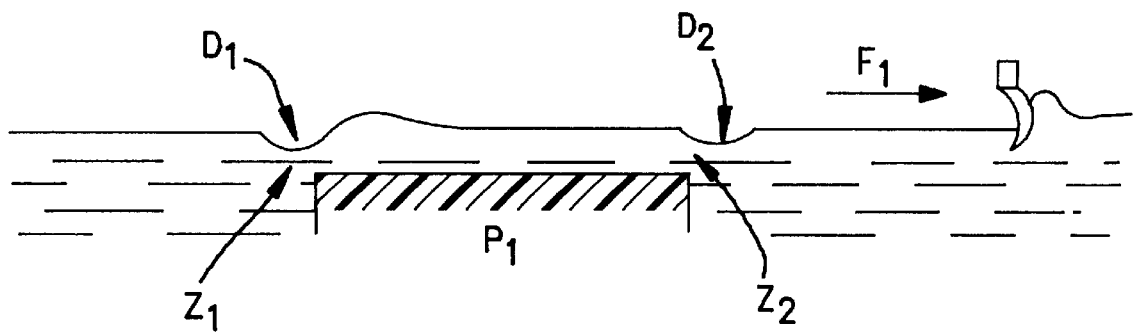
Figure 3:
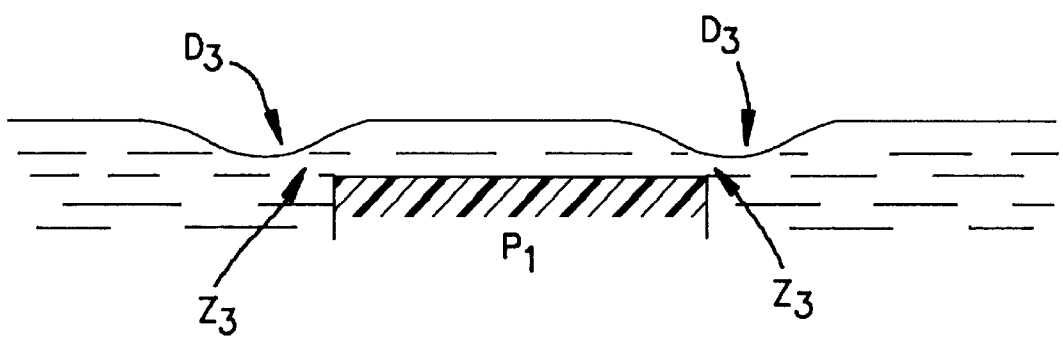
Figure 4:
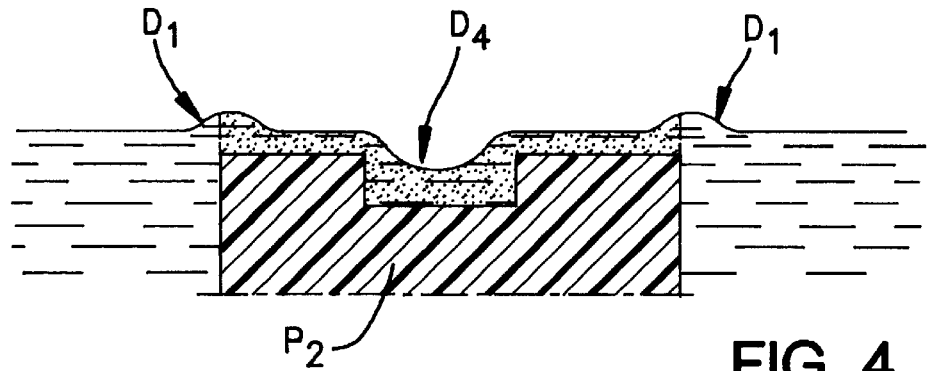
Figure 5:
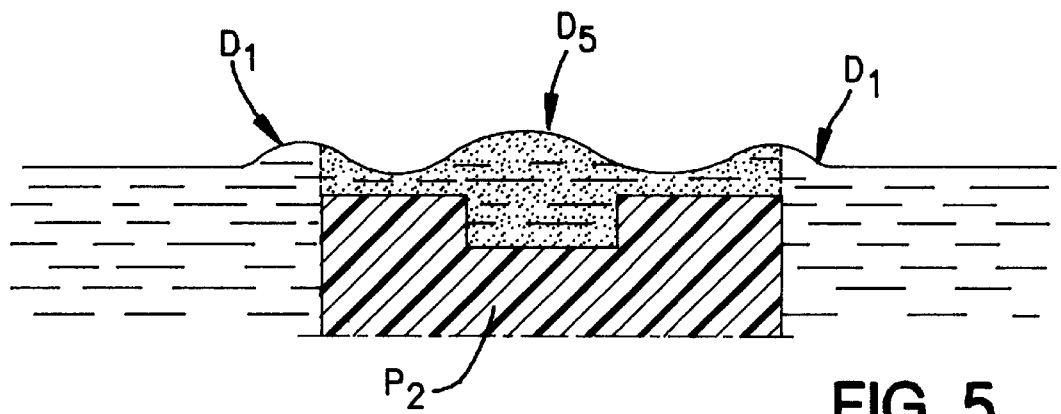
Figure 19:
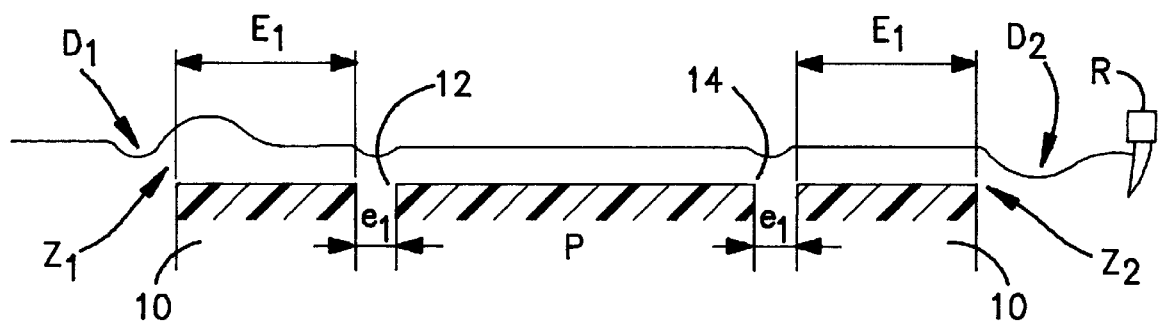
FIG. 19 is a sectional view along a vertical plane parallel to the direction of movement of a scraper member, illustrating the implementation of the process according to the invention.
Figure 20:
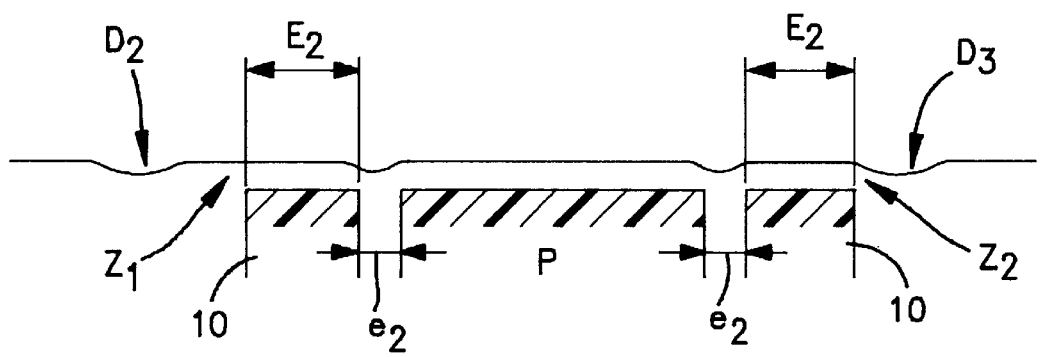
FIG. 20 is a sectional view along a vertical plane perpendicular to the direction of movement of a scraper member, illustrating this implementation.

This is because, as is understood, by virtue of the presence of a casing structure forming a covering around the part, the phenomenon represented in FIGS. 19 and 20 will occur when a new layer of liquid material is put in place, for example using a scraper, these figures respectively corresponding to FIGS. 2 and 3 which illustrate the process of the prior art. FIG. 19 shows that the perturbations D1, D2 which occur in the liquid/solid transition regions Z1, Z2 are offset to the upstream and downstream edges of the covering 10, whereas the regions corresponding respectively to the upstream 12 and downstream 14 edges of the part P are virtually free of any perturbation, by virtue of the immediate proximity of the covering. The very slight perturbations which may occur in the transition regions between the covering and the part are virtually instantaneously corrected under the action of the surface tension of the liquid. This surface tension also has the effect of limiting the amplitude of the defect in this region, which will make it possible to draw conclusions therefrom regarding the actual structure of the covering, as will be seen below.

The same is true for the perturbations D3 which occur in the regions Z3 along those edges of the casing or covering structure which are substantially parallel to the direction of movement of the scraper (see FIG. 20).

By way of example, the following table will give indicative values of the various significant distances to be respected, for two materials with different viscosities.

In this table:

e1 denotes the distance separating the covering 10 from the part P, along the direction parallel to the direction of movement of the scraper;

e2 denotes the distance separating the covering from the part, along the direction perpendicular to the direction of movement of the scraper;

E1 denotes the width of the covering 10, along the direction parallel to the direction of movement of the scraper;

E2 denotes the width of the covering 10, along the direction perpendicular to the direction of movement of the scraper.

| Material Viscosity (at 30°) | LOCTITE (stereolithography resin 8010) approximately 1000 centipoise | DUPONT (SONOS 5100) approximately 5000 centipoise |
| --- | --- | --- |
| E1 | >1 cm | >2 cm |
| E2 | >1 mm | >3 mm |
| e1 | from 0.1 mm to 5 mm | from 0.8 mm to 3 mm |
| e2 | from 0.1 mm to 5 mm | from 0.5 mm to 3 mm |

It is quite clearly preferable to keep as small a distance as possible between the covering constituted by the casing structure and the part, since a small distance guarantees an absence or substantial absence of perturbations in the transition regions.

It will also be noted that the width of the casing structure may in some cases be smaller on either side of the part, along a direction perpendicular to the direction of movement of the scraper, since the perturbations are actually weaker in these lateral regions than along the upstream and downstream edges of the part.

As will now be seen, the casing structure may take on very different configurations, only examples of which are represented.

Figure 9:
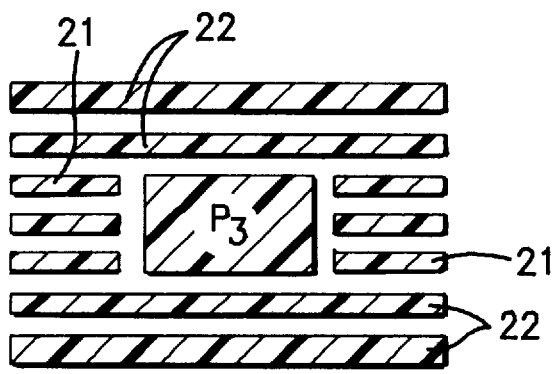
FIGS. 9 and 10 are sectional views in planes similar to those in FIGS. 7 and 8, corresponding to a variant.
Figure 10:
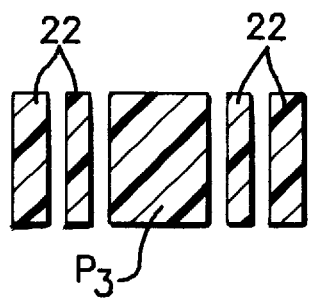

FIGS. 9 and 10 represent a structure formed by wall elements 21, 22 which are parallel to each other and are parallel to the direction of movement of the scraper. These discontinuous wall elements offer the advantage of requiring less material, of presenting less resistance when positioning each successive liquid layer and therefore of having a smaller perturbing effect on the spreading of this layer by means of the scraper. The risk of bubble formation is also reduced.

The various wall elements have been presented as being separate from each other and separate from the part. Of course, these elements may be linked to each other at intervals, in order to improve cohesion.

A relatively thin skin may be provided in the portion of the casing structure closest to the part.

Similarly some of these elements may be linked discontinuously to the part, without thereby departing from the scope of the invention.

Such an arrangement, in which a number of discrete contact points may exist between the casing structure and the part, is in no way comparable with support structures for the part, such as are used in the technique for manufacturing parts with a particular shape, and which do not allow a substantial reduction in the preparation times separating two successive solidification phases.

Figure 11:
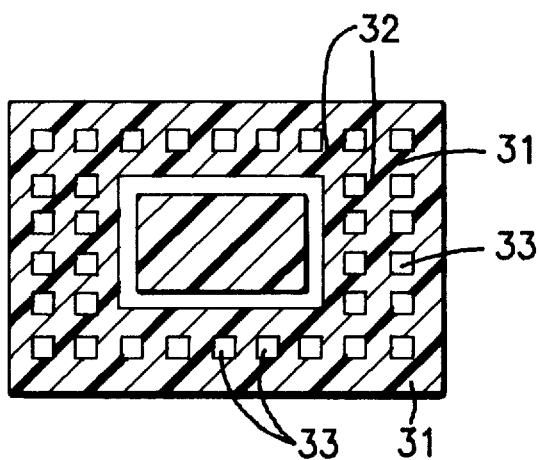
FIGS. 11 and 12 are also views similar to those in FIGS. 7 and 8, illustrating another variant.
Figure 12:
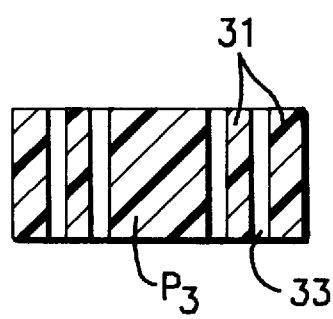

In the embodiment represented in FIGS. 11 and 12, the casing structure which forms a covering, when viewed in section in a horizontal plane (FIG. 11), has the shape of a grid formed by mutually perpendicular wall elements 31, 32, some 31 of which are parallel to the direction of movement of the scrapers, so that, in its entirety, the structure has vertical recesses 33 which may furthermore be continuous or discontinuous.

The dimension of the recessed parts containing the unsolidified material should be sufficiently small for the assembly to behave as a substantially homogeneous and continuous solid surface, so as not to cause significant perturbations when the liquid layer is spread.

Figure 13:
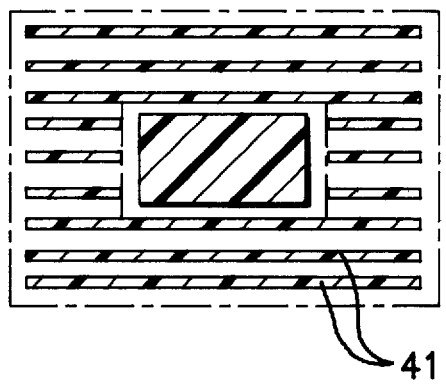
FIGS. 13 and 14 are two schematic sectional views showing two structural forms of the casing or covering according to the invention.

FIG. 13 represents a casing structure which consists, as in the example in FIGS. 9 and 10, of partition elements 41 parallel to the direction of movement of the scraper. In this embodiment, the width of the partition elements is less than in the example in FIG. 9, the effect of which is to present a front, perpendicular to the direction of movement of the scraper, which has a smaller area, which reduces the disturbances during the flow of the liquid.

This reduction in disturbances is useful in that it reduces or eliminates the formation of small air bubbles which risk becoming trapped inside the solidified part.

As in the case in FIG. 9, in the vicinity of the part, these discontinuous wall elements constitute a kind of covering (indicated in dot and dashed lines) which is not continuous but has essentially the same effect as in the case of a continuous surface. This is due to the fact that each solidified portion of the covering imposes a flow-speed restriction on the liquid immediately surrounding it, so that a solidified portion actually corresponds to a larger region with favourable influence that its own area. It is therefore sufficient for the regions of influence of the various discontinuous solidified portions to overlap in order for an effect to be obtained which is comparable with that obtained by a continuous solidified surface of larger area.

Figure 14:
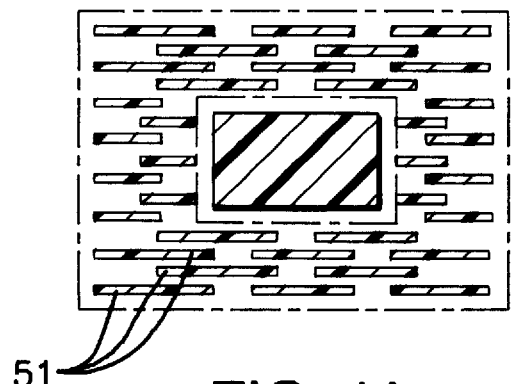

This principle is employed in the embodiment in FIG. 14, where the casing structure consists of wall elements 51 which are discontinuous not only in the orientation transverse to the direction of movement of the scraper, but also in the longitudinal orientation, parallel to this direction. The effect obtained by means of such wall elements is entirely comparable with that obtained in the example in FIGS. 9 or 13, or else in that in the examples in FIGS. 7, 8 and 11, 12, in which the solidified surfaces are substantially larger.

Here again, the partition elements 51 arranged in the vicinity of the portion constitute a sort of covering and make it possible to obtain the desired function.

The solidified regions should have a transverse dimension, or width, which is sufficient to ensure that they are stable. The gap between these partition elements may be of the order of a few millimeters, the value of this gap depending on the viscosity of the material used.

Figure 15:
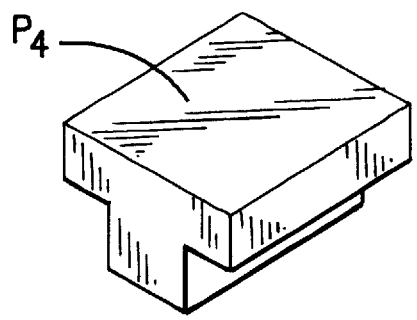
FIG. 15 is a perspective view of another shape of a part.

FIG. 15 represents a part P4 which is slightly more complex, since it has a T-shaped cross-section.

In this case, the casing structure is designed so as to constitute a covering which matches the contour of the part.

Figure 16:
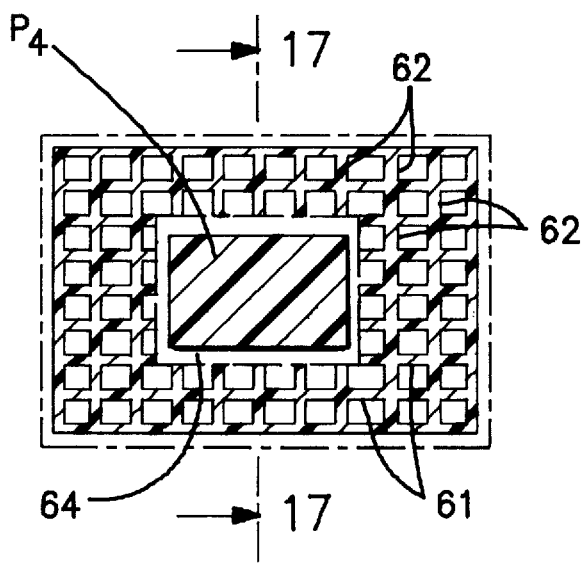
FIGS. 16 and 17 are two sectional views, respectively in a horizontal plane and in a vertical plane, showing an example of a casing structure according to the invention, used for producing the part in FIG. 15.
Figure 17:
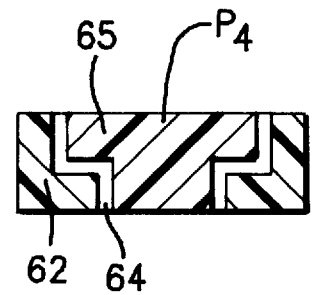

If, as represented in FIGS. 16 and 17, the casing structure is formed by a three-dimensional grid, the transverse elements 62 have a L-shaped cross-section in the region where they engage with the part, as represented in FIG. 17, so as to form a gap 64 of essentially constant thickness between the inner contour of the covering and the part, both in the various horizontal sections of the part and in the vicinity of the protruding portions 65.

As in the preceding examples, there may be contact points between the casing structure and the part, without thereby departing from the general scope of the invention.

Figure 18:
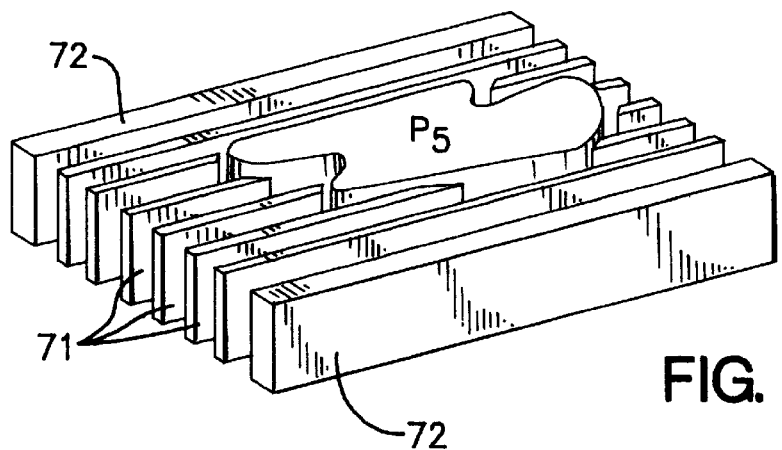
FIG. 18 is a perspective view of a part having a slightly more complex shape, surrounded by a casing structure according to the invention.

FIG. 18 represents a perspective view of a part P5 with curvilinear contour, associated with a casing structure consisting of wall elements 71, 72 which are substantially parallel to each other and parallel to the direction of movement of the member, such as a scraper, used for distributing and spreading the liquid material. In this embodiment, the wall elements 72 arranged at the two lateral ends are thicker than the wall elements 71 arranged in the central portion.

These two end wall elements have the additional function of essentially withstanding the force exerted by the member for spreading the liquid. This arrangement makes it possible to make thinner intermediate partition elements 71, since they withstand virtually no vertical forces, so that less material is consumed.

It can be seen from the above discussion that numerous embodiments may be conceived and, in particular, the casing structure may take on widely varied shapes, the essential fact being that this casing structure constitutes a continuous or discontinuous covering which substantially matches the outer contour, and optionally the inner contour, of the or each part manufactured.

When the casing structure is formed by essentially discontinuous elements, a continuous skin may be formed in the portion of this structure which is closest to the part.

Under this assumption of a discontinuous casing structure, the dimensions of the unsolidified internal regions of this structure should be designed, in particular in accordance with the thickness of the layer. These dimensions should be commensurately larger when the layer is thicker. By way of example, in the case of a grid (FIGS. 11 or 16) the unsolidified parts may have a dimension of the order of 5 mm in the case of a layer with a thickness equal to 75 microns, this dimension being reduced to 3 mm in the case of a 15 micron layer.

As already mentioned, contact points may be provided between the casing structure and the part. However, these contact points are not systematic and therefore have no relation with support structures such as are used for producing certain parts of particular shape.

Furthermore, the process according to the invention can be used in combination with conventional support means, when the part includes, for example, protruding portions which should be supported by means of small columns or equivalent means.

Although a detailed description has not been given of an installation making it possible to implement this process, such an installation being known per se, a description will be given below, with reference to FIGS. 21 to 24, of some arrangements which these installations may have in order to allow particularly efficient implementation of the process according to the invention.

Figure 21:
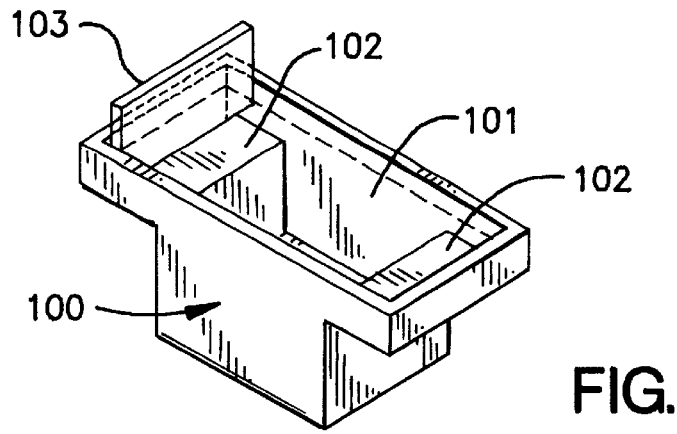
FIG. 21 is a schematic partial view showing a tank which can be used for implementing the process according to the invention.

FIG. 21 schematically represents a tank 100 containing the material which is to be solidified in order to produce one or more parts.

This tank includes a relatively deep central part 101, in which the plate (not represented) for supporting the part is accommodated, and two end parts 102 which are substantially less deep. These two end regions allow the scraper member 103 to execute a degree of preparatory motion and to reach its nominal speed before entering the region in which the part and its covering will be produced.

The extent of this preparatory motion is less when the material used is more viscous. It may be of the order of 1 to 5 cm, depending on the value of this viscosity.

The particular shape of the tank represented in FIG. 21 makes it possible to execute this preparatory motion of the scraper and to form a liquid material wave of sufficient amplitude, without thereby significantly increasing the total volume of the tank and the quantity of material used.

Figure 22:
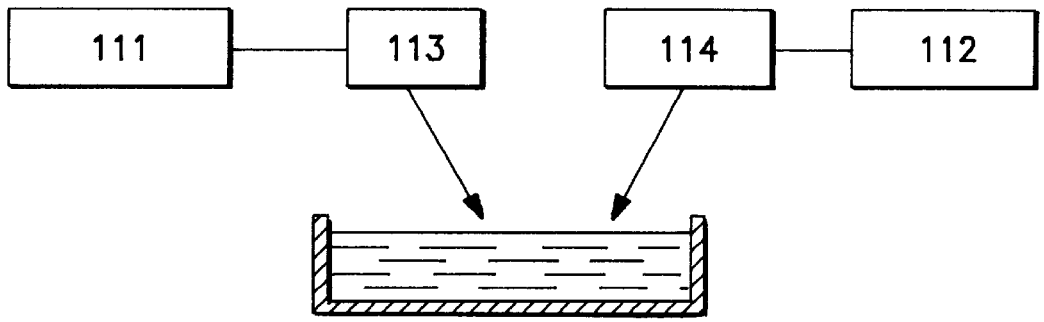
FIG. 22 is a diagram illustrating a variant of an installation which can be used for implementing the process according to the invention.

Although the same light source and, in general, the same means, are preferably used for solidifying the material constituting the part and the casing or covering structure, it is possible, as represented in FIG. 22, to use different means for solidifying the part, on the one hand, and the casing structure, on the other hand.

In the example represented, two separate light sources 111, 112 are used, as are two mechanisms 113, 114 for deflecting the rays emitted by these two sources.

It is thus possible to use a light source 111 consisting of a laser and a deflection mechanism 113 consisting of electrically operated mirrors in order to produce the casing, whereas a light source 112, which may be an ultraviolet lamp, associated with another deflection mechanism 114, will be used in order to produce the part.

In general, and regardless of the illumination means used, efforts will be made to deduce the information required for producing the covering from the information already available for producing the or each part, it being possible to obtain this result by accordingly adapting the programs used for manufacturing each part.

It has been indicated that one of the important advantages of this process resides in the significant reduction of the preparation time preceding the solidification phase for each layer during the fabrication of a part. This preparation phase, which lasts more than 30 seconds in the prior art, can be reduced to a duration of a few seconds (for example less than 10 seconds and preferably less than 5 seconds). This spectacular gain results, on the one hand, from the fact that the speed of movement of the scraper can be higher, since the latter moves over a substantially continuous or homogeneous surface throughout the region in which the part is manufactured, and in its immediate vicinity. Furthermore, the relaxation time which was previously necessary is virtually completely eliminated since a substantially horizontal surface is obtained directly after the scraper has moved past, the very slight surface defects of which surface are rectified almost instantaneously because of the surface tension of the liquid.

However, the effect of this time saving is to increase the frequency of the solidification phases, which are known to cause heating of the material. It may therefore be desirable to cool the surface of the material contained in the tank as well as the solidified portions of the part and of the casing structure. Such cooling means are described in FIGS. 23 and 24.

Figure 23:
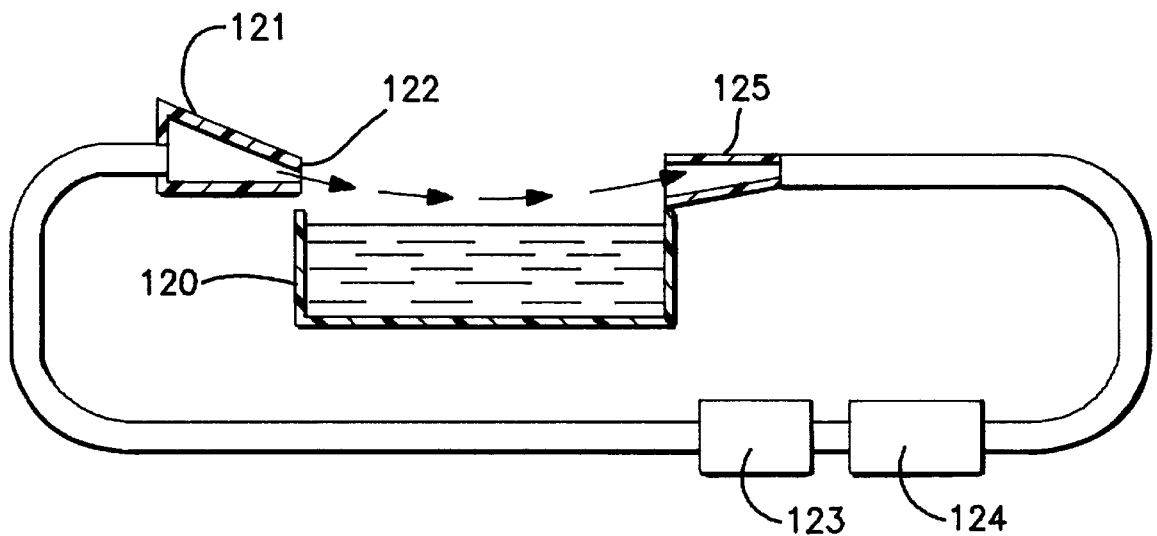
FIG. 23 schematically represents a first embodiment of a cooling device.

In the example in FIG. 23, a distributor 121 is arranged along one of the edges of the tank 120 and is equipped with a nozzle 122 and fed with refrigerated air from a pump 123 and a heat exchanger 124. A collector 125 is placed at the opposite end of the tank and collects the cooling gas, which it recycles to the exchanger. Such a device has the advantage of being fixed.

Figure 24:
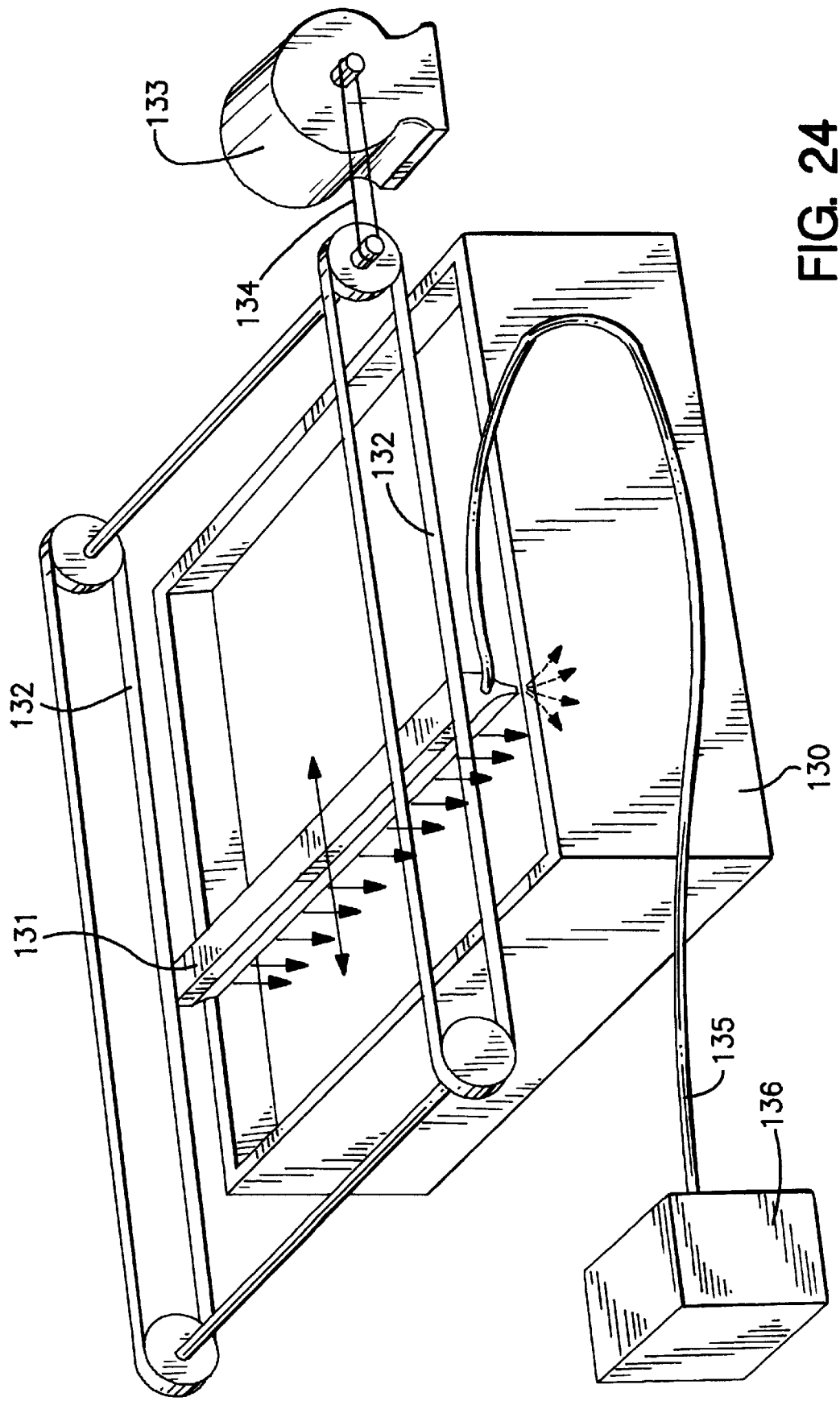
FIG. 24 is a perspective view, also schematic, representing a second embodiment of such a cooling device.

In the embodiment in FIG. 24, use is made of a device which includes a mobile strip 131 which also constitutes a distributor for air or refrigerated gas, equipped with a nozzle which directs this air onto the surface of the tank 130. This strip is supported by two belts 132 which are themselves driven alternately in one direction and the other by a motor 133 and a transmission device 134.

The mobile strip is connected by a hose 135 to a pump 136 and is supplied with cold air from this pump, which is itself associated with a refrigeration device, if necessary.

The advantages of the process and an installation according to the invention have been set out in the body of this description.

An essential advantage, which also constitutes a characteristic of the process, resides in the spectacular reduction in the duration of the preparation phase of each layer of material to be solidified.

This advantage nay also be accompanied by a reduction in the power of the light source used for producing the solidification, the duration of this solidification phase then being slightly increased.

Another advantage resides in the possibility of producing very thin layers, for example with a thickness of less than 50 microns, which is made possible by the very high precision and uniformity of the surface of each layer.

This invention may be embodied independently of the way in which the solidification of the material is brought about, and with installations having widely varied characteristics. In particular, it is possible to use a plurality of parallel scraper members for spreading the successive layers of material to be solidified. It is possible to alter the relative position of the support and the free surface of the material to be solidified, either by moving this support and the tank relative to one another, or by using any simple means for supplying the tank with material to be solidified. Provision may also be made for the elements constituting the grid to have an orientation which is oblique with respect to the direction of movement of at least one member for spreading each layer of unsolidified material.

What is claimed is:

1. Process for the manufacture of a three-dimensional part, in which the starting material is a material in a liquid, quasi-liquid or powder state capable of solidifying under the effect of light that is in a tank having a support for supporting the object to be manufactured, means for altering and adjusting the relative height of the material to be solidified and the support, means for selectively illuminating predetermined regions of the surface of the material contained in the tank, means for successively depositing a layer of unsolidified material on the surface of each previously solidified layer, the method comprising the steps of:

repeating the steps of depositing a layer of unsolidified material and solidifying the deposited material so that the part is produced in successive layers; and providing at least one casing structure (10; 21, 22; 31, 32; 41; 51; 61, 62; 71, 72) adjacent an edge of the part during said depositing and solidifying steps, this casing structure forming a covering, the portion of which closest to the part substantially follows the contour of the part while being separated therefrom by a distance (e; e1, e2) which is sufficiently small for a reduced-perturbation region to be created in the vicinity of the part as each successive layer of unsolidified material is deposited.

2. Process according to claim 1, wherein the casing structure forming a covering extends horizontally a distance (E1, E2) which is sufficient for the perturbations produced as each successive layer of unsolidified material is deposited to be offset out of the region where the part is fabricated.

3. Process according to claim 1, wherein the preparation time, the time between the end of a solidification phase and the start of the following solidification phase, is less than 10 seconds.

4. Process according to claim 3, wherein the preparation time is less than 5 seconds.

5. Process according to claim 1, wherein the casing structure constitutes a substantially continuous covering matching the shape of the contour of the part.

6. Process according to claim 1, wherein the casing structure has, at least in the vicinity of the part, a discontinuous surface whose envelope substantially matches the shape of the contour of the part.

7. Process according to claim 6, wherein the casing structure includes a substantially continuous skin in the vicinity of the part.

8. Process according to claim 1, wherein the casing structure is formed by a solid mass.

9. Process according to claim 6, wherein the casing structure is recessed and has, in section through a horizontal plane, the shape of a grid.

10. Process according to claim 9, wherein said grid is formed by elements arranged respectively parallel and perpendicular to the direction of movement of at least one member for spreading each layer of unsolidified material.

11. Process according to claim 9, wherein the elements constituting the grid have an orientation which is oblique with respect to the direction of movement of at least one member for spreading each layer of unsolidified material.

12. Process according to claim 6, wherein the casing structure is formed by wall elements which are substantially parallel to each other and parallel to the direction of movement of at least one member for spreading each layer of unsolidified material.

13. Process according to claim 12, wherein the said wall elements are furthermore discontinuous along the direction parallel to the direction of movement of the member for spreading each layer of unsolidified material.

14. Process according to claim 6, wherein, when the casing structure is formed by discontinuous elements, there are at least one of horizontal and vertical links between these discontinuous elements.

15. Process according to claim 1, wherein discrete links are provided between the casing structure and the part.

16. Process according to claim 1, wherein the distance (e; e1, e2) between the casing structure and the or each part is between 0.1 and 5 mm.

17. Process according to claim 1, wherein the width (E1, E2) over which the casing structure extends in a horizontal plane is greater than or equal to 1 cm, along a direction parallel to the direction of movement of a member for spreading each layer of unsolidified material, and greater than or equal to 1 mm along a direction perpendicular to said direction of movement of a member for spreading the layer of unsolidified material.

18. Process according to claim 17, wherein the width (E1, E2), in a horizontal plane, of the casing structure is commensurately greater when the viscosity of the material used is higher.

19. Process according to claim 1, wherein a scraper spreads each layer of material to be solidified, and further comprising the step of executing a preparatory motion with the scraper to form a wave of material to be solidified and to bring the scraper to its chosen translational speed before it comes into contact with a layer of solidified material.

20. Process according to claim 1, wherein the same solidification means are used for making the successive layers forming the part and the casing structure.

21. Process according to claim 1, wherein different means (111, 113; 112, 114) are used for solidifying the layers of material constituting the part, and the layers of material constituting the casing structure.

22. Process according to claim 1, wherein layers of uniform thickness are formed to fabricate the part and to fabricate the casing structure.

23. Process according to claim 1, wherein layers of irregular thickness are formed to fabricate the part and the casing structure.

24. Process according to claim 1, wherein the surface of the material contained in the tank is cooled.

25. Installation for the manufacture of three-dimensional parts, comprising:
   a tank which contains a material in a liquid, quasi-liquid or powder state capable of being solidified under the action of light;
   a support in said tank for supporting the part manufactured;
   means for altering the relative height of the support with respect to the level of the material to be solidified;
   means for solidifying a surface layer of the material;
   a scraper for placing a layer of unsolidified material above each successive layer of solidified material, said scraper being movable along a defined direction;
   said tank having, at its two opposite ends oriented along said direction of movement of the scraper, two regions (102, 103) whose depth is less than the depth of the tank in its central part (101), the two reduced-depth regions containing unsolidified material.

26. Installation according to claim 25, wherein said regions constitute preparatory-motion regions for the scraper.

27. Installation according to claim 25, further comprising a device for cooling an upper part of the tank.

28. Installation according to claim 27, wherein the cooling device comprises a fixed distributor (121) which is arranged along one of the edges of the tank (120) and defines a nozzle (122) for spraying cooling fluid, said distributor being fed with cooling fluid from a pump (123) and a refrigerating device (124).

29. Installation according to claim 28, further comprising a suction collector (125), connected to the refrigeration device and the pump, at the end of the tank opposite the end where the distributor is located.

30. Installation according to claim 29, wherein the cooling device comprises a mobile strip (131), arranged above the tank (130) and including a nozzle for spraying a cooling fluid towards the surface of the material contained in the tank, this strip being connected to a cooling-fluid source (136).

31. A method of smoothing a surface of a layer of part-forming material deposited on a face of a part being made by stereolithography, the method comprising the steps of:
   distributing the layer of the part-forming material across the face of the part by moving a scraper over an edge of the part and across the face while the face is below a surface level of the part-forming material;
   solidifying the layer of part-forming material; and
   concurrently with the respective distributing and solidifying steps, depositing and solidifying the layer of the part-forming material immediately adjacent the edge of the part to form a casing that is spaced from the edge by a distance that is less than one-half a thickness of the casing in a direction parallel to a direction of movement of the scraper to reduce perturbations at the edge caused by movement of the scraper over the edge.

32. The method of claim 31, wherein the distance is less than one-tenth the thickness.

33. The process of claim 1, wherein a moving scraper deposits the part-forming material on the surface of the previously solidified layer, and wherein the distance is less than one-half a thickness of the casing structure in a direction parallel to a direction of movement of the scraper.

* * * * *